(12) United States Patent
Rollinger et al.

(10) Patent No.: US 8,006,670 B2
(45) Date of Patent: Aug. 30, 2011

(54) ENGINE CONTROL WITH VALVE DEACTIVATION MONITORING USING EXHAUST PRESSURE

(75) Inventors: John Eric Rollinger, Sterling Heights, MI (US); Michael John Cullen, Northville, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 12/722,017

(22) Filed: Mar. 11, 2010

(65) Prior Publication Data

US 2011/0144888 A1    Jun. 16, 2011

(51) Int. Cl.
*F02D 13/06* (2006.01)
*F02D 7/00* (2006.01)

(52) U.S. Cl. ............ 123/481; 123/198 F; 123/676; 701/114

(58) Field of Classification Search .......... 123/481, 123/676, 198 F, 679; 73/114.76; 701/114, 701/115
See application file for complete search history.

(56) References Cited

U.S. PATENT DOCUMENTS

| | | | | |
|---|---|---|---|---|
| 5,193,513 A * | 3/1993 | Marko et al. | ............ | 123/676 |
| 5,549,080 A | 8/1996 | Uchikawa | | |
| 5,769,041 A * | 6/1998 | Suzuki et al. | ............ | 123/73 C |
| 6,332,446 B1 * | 12/2001 | Matsumoto et al. | ....... | 123/198 F |
| 6,499,470 B2 * | 12/2002 | Takagi et al. | ............ | 123/481 |
| 6,651,490 B1 * | 11/2003 | Ceccarani et al. | ........ | 73/114.74 |
| 6,691,021 B2 * | 2/2004 | Takagi et al. | ............ | 701/109 |
| 6,910,458 B2 * | 6/2005 | Oki | ............ | 123/198 F |
| 7,024,304 B2 | 4/2006 | Fukasawa et al. | | |
| 7,143,727 B1 * | 12/2006 | Winstead et al. | ........ | 123/90.15 |
| 7,204,132 B2 | 4/2007 | Reed et al. | | |
| 7,314,034 B1 * | 1/2008 | Waters et al. | ............ | 123/198 F |
| 7,908,913 B2 * | 3/2011 | Cinpinski et al. | ........ | 73/114.79 |
| 7,918,210 B2 * | 4/2011 | Gibson et al. | ............ | 123/481 |
| 2007/0239343 A1 | 10/2007 | Okubo et al. | | |
| 2009/0007877 A1 * | 1/2009 | Raiford | ............ | 123/192.1 |
| 2010/0175463 A1 * | 7/2010 | Doering et al. | ............ | 73/114.37 |

* cited by examiner

*Primary Examiner* — Thomas Moulis
(74) *Attorney, Agent, or Firm* — Julia Voutyras; Brooks Kushman P.C.

(57) ABSTRACT

A system or method for controlling a multiple cylinder internal combustion engine operable in a reduced displacement mode with at least one valve or cylinder selectively deactivated include controlling the engine in response to detecting opening of an exhaust valve after deactivation based measured or inferred exhaust pressure changes after deactivation. In one embodiment, controlling the engine includes reactivating one or more deactivated cylinders/valves, inhibiting subsequent deactivation, and/or storing a diagnostic code in a computer readable storage medium in response to detecting valve opening after deactivation.

16 Claims, 5 Drawing Sheets

ENGINE CONTROL WITH VALVE DEACTIVATION MONITORING USING EXHAUST PRESSURE

BACKGROUND

1. Technical Field

Systems and methods for controlling an internal combustion engine to monitor valve deactivation using exhaust pressure.

2. Background Art

Fuel economy for a multi-cylinder internal combustion engine can be improved by deactivating some of the engine cylinders under certain operating conditions. Reducing the number of operating cylinders reduces the effective displacement of the engine such that it is sometimes referred to as a variable displacement engine. Depending upon the particular configuration of the variable displacement engine, one or more cylinders may be selectively deactivated to improve fuel economy under light load conditions, for example. In some engine configurations, a group of cylinders, which may be an entire bank of cylinders, is selectively deactivated. Cylinder deactivation may include deactivation of intake valves, exhaust valves, or both depending upon the particular application and engine technology. Various techniques have been developed for activating and deactivating intake and/or exhaust valves that rely on mechanical, hydraulic, electric/electronic or combination devices to implement valve deactivation in response to a command signal from an engine controller.

A number of strategies have been used to monitor operation of valve deactivation systems. One strategy analyzes the period between intake pressure pulses measured by a manifold absolute pressure (MAP) sensor to monitor operation of an intake valve deactivation system. However, this strategy is not believed to provide a reliable indicator for monitoring exhaust valve deactivation. One technique for monitoring operation of exhaust valve deactivation includes monitoring a knock sensor.

SUMMARY

A system or method for controlling a multiple cylinder internal combustion engine operable in a reduced displacement mode with at least one valve or cylinder selectively deactivated include controlling the engine in response to detecting opening of an exhaust valve after deactivation based measured or inferred exhaust pressure changes after deactivation. In one embodiment, controlling the engine includes reactivating one or more deactivated cylinders/valves, inhibiting subsequent deactivation, and/or storing a diagnostic code in a computer readable storage medium in response to detecting valve opening after deactivation.

Those of ordinary skill in the art will recognize a number of advantages associated with various embodiments according to the present disclosure. For example, use of an exhaust pressure sensor to monitor operation of exhaust valve deactivation provides a more robust signal with better signal to noise ratio than various other strategies for more reliable system monitoring. Reliable monitoring of exhaust valve deactivation systems may lead to improved fuel economy and reduce or eliminate the potential for increased oil consumption and possible catalyst poisoning resulting from exhaust valves that do not respond to a deactivation command.

The above advantages and other advantages and features will be readily apparent from the following detailed description of the preferred embodiments when taken in connection with the accompanying drawings.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a four-stroke, multi-cylinder port injected internal combustion engine operable in a variable displacement mode with electromagnetically actuated intake and/or exhaust valves and an electronically controlled throttle valve. Those of ordinary skill in the art may recognize similar applications or implementations with other engine/vehicle technologies including direct injected and/or port injected engines, and engines using different cylinder or valve deactivation technology including but not limited to mechanical, electromechanical, and hydraulic systems that deactivate one or more cylinders or groups of cylinders, such as a bank of cylinders. Similarly, although the present disclosure is primarily directed to monitoring operation of exhaust valve deactivation or combined intake/exhaust valve deactivation, those of ordinary skill in the art may recognize that the teachings of the present disclosure may be modified for application to intake valve deactivation systems. Likewise, embodiments of the present disclosure may be used in engines having various types of valvetrains including overhead valvetrains (OHV), also referred to as type I valvetrains, as well as pushrod or cam-in-block valvetrains, also referred to as type II valvetrains.

Figure 1:
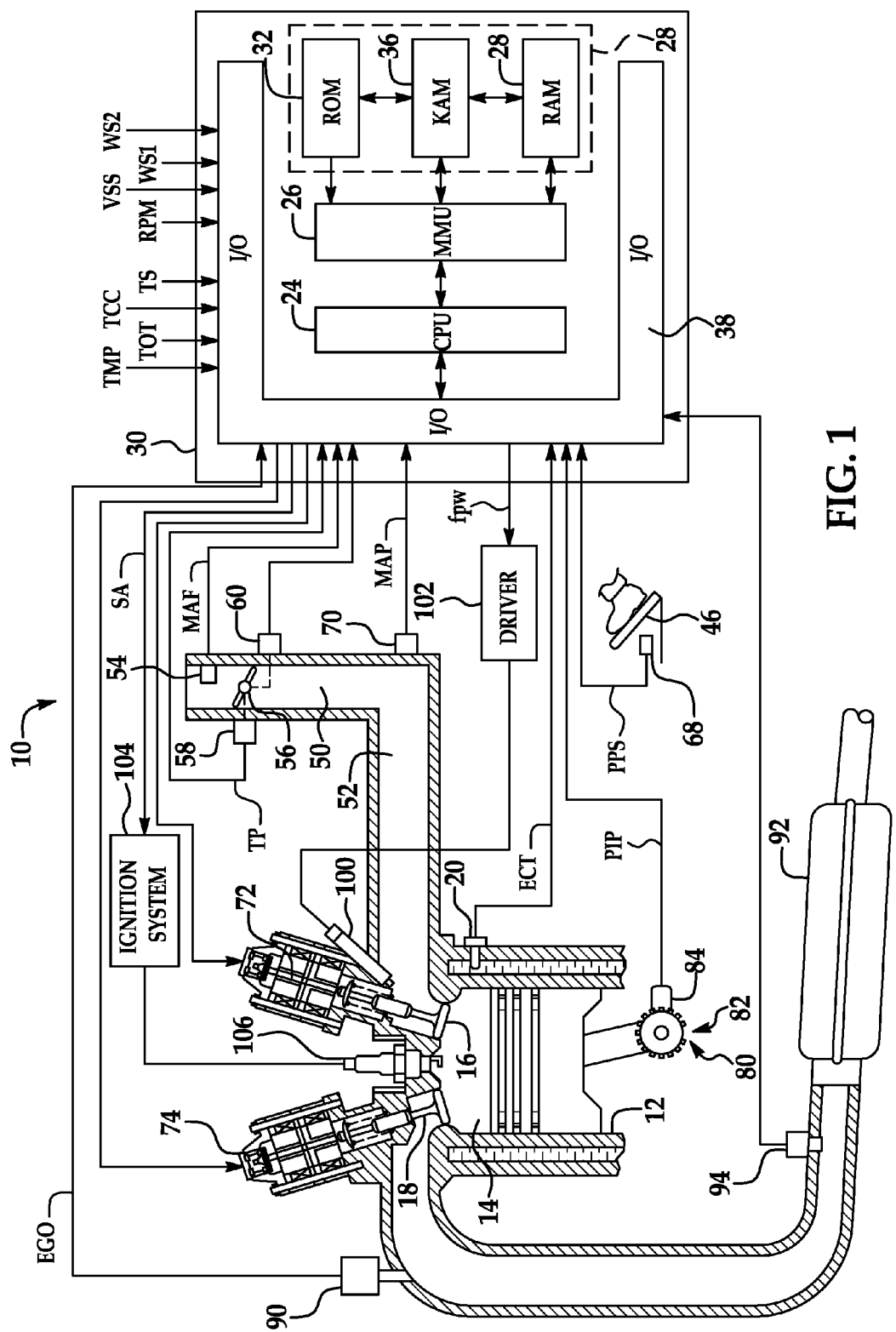
FIG. 1 is a block diagram illustrating operation of a representative engine/vehicle application with valve deactivation monitoring pressure according to the present disclosure.

In the representative embodiment illustrated in FIG. 1, system 10 includes a vehicle (not specifically illustrated) powered by an internal combustion engine having a plurality of cylinders, represented by cylinder 12, with corresponding combustion chambers 14. As one of ordinary skill in the art will appreciate, system 10 includes various sensors and actuators to effect control of the engine/vehicle. One or more sensors or actuators may be provided for each cylinder 12, or a single sensor or actuator may be provided for the engine. For example, each cylinder 12 may include four gas exchange valves including two intake valves 16 and two exhaust valves 18, with only one of each shown in the Figure. However, the engine may include only a single engine coolant temperature sensor 20. In the embodiment illustrated in FIG. 1, the engine includes electromagnetically or electronically actuated intake valves 16 and exhaust valves 18 in communication with a microprocessor-based controller 30 to control valve opening and closing times and for selectively deactivating one or more cylinders to provide variable displacement operation. In one embodiment, cylinder deactivation includes deactivation of at least the exhaust valves for a particular cylinder. Other embodiments may include selective deactivation of both intake and exhaust valves for a particular cylinder and/or deactivation of exhaust valves for a group of cylinders, such as a cylinder bank. Various other embodiments include alternative valve configurations and valve control using mechanical, electromechanical, hydraulic, and/or combination valve actuation, activation, and/or deactivation. For example, in one embodiment, intake valves 16 are electronically actuated and exhaust valves 18 are conventionally actuated by an associated camshaft (not shown). Alternatively, intake valves 16 and exhaust valves 18 may be conventionally actuated using a cam-in-block configuration with pushrods and rocker arms, with exhaust valves 18 having a mechanical and/or hydraulic deactivation mechanism generally known in the art.

Various embodiments may include a group of valves that may be selectively deactivated, by deactivating associated intake and/or exhaust valves for deactivated cylinders, in addition to cylinders that can not be deactivated. For example, in one embodiment, a "V" configuration engine has one bank of cylinders that are selectively deactivated with a second bank that can not be deactivated. Other variations may include multiple intake valves and/or multiple exhaust valves per cylinder with a subset of the valves being deactivated during cylinder deactivation. For example, an engine may have three valves per cylinder with one intake valve and two exhaust valves where only one exhaust valve is deactivated during cylinder deactivation.

In one embodiment, system 10 may be selectively operated in a variable displacement mode with fewer than all cylinders 12 participating in combustion by deactivating corresponding actuators, such as intake valves 16 and/or exhaust valves 18. Operation in a variable or reduced displacement mode is generally associated with higher manifold pressure and wider opening of throttle valve 56 to reduce pumping losses and increase efficiency of the activated or operating cylinders. Monitoring of reduced displacement mode operation using measured or inferred exhaust pressure according to the present disclosure may be used to detect conditions where exhaust valves 18 continue to operate after exhaust valve deactivation is commanded as described in greater detail herein. Exhaust valves that continue to operate after a commanded deactivation may result in reduced fuel economy, increased oil consumption, and potential catalyst degradation or poisoning and may not be noticeable to the vehicle operator. As such, detection of this condition according to the present disclosure may be used to modify subsequent control of the engine, which may include inhibiting operation in the variable displacement mode, storing a diagnostic code, and/or alerting the vehicle operator via an indicator light or diagnostic message, for example.

Controller 30 may include a microprocessor 24 or central processing unit (CPU), in communication with a memory management unit (MMU) 26. MMU 26 controls movement of data among various computer readable storage media 28 and communicates data to and from CPU 24. Computer readable storage media 28 may include volatile and nonvolatile storage in read-only memory (ROM) 32, random-access memory (RAM) 34, and keep-alive memory (KAM) 36, for example. KAM 36 is a persistent or non-volatile memory that may be used to store various operating variables while CPU 24 is powered down. Computer-readable storage media 28 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. Computer-readable storage media 28 may also include floppy disks, CD-ROMs, hard disks, and the like.

CPU 24 communicates with various engine/vehicle sensors and actuators via an input/output (I/O) interface 38. Interface 38 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of parameters, systems, and/or components that may be directly or indirectly actuated under control of CPU 24, through I/O interface 38, are fuel injection timing, rate, and duration, throttle valve position, spark plug ignition timing (for spark-ignition engines), intake/exhaust valve timing and duration, front-end accessory drive (FEAD) components such as an alternator, air conditioning compressor, and the like. Sensors communicating input through I/O interface 38 may be used to indicate crankshaft position (PIP), engine rotational speed (RPM), wheel speed (WS1, WS2), vehicle speed (VSS), coolant temperature (ECT), intake manifold pressure (MAP), exhaust back pressure (EBP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear or ratio (PRN), transmission oil temperature (TOT), transmission turbine speed (TS), torque converter clutch status (TCC), deceleration or shift mode (MDE), for example.

Some controller architectures do not contain an MMU 26. If no MMU 26 is employed, CPU 24 manages data and connects directly to ROM 32, RAM 34, and KAM 36. Of course, more than one CPU 24 may be used to provide engine control and controller 30 may contain multiple ROM 32, RAM 34, and KAM 36 coupled to MMU 26 or CPU 30 depending upon the particular application.

In operation, inducted air passes through intake 50 and is distributed to the plurality of cylinders via an intake manifold, indicated generally by reference numeral 52. System 10 may include a mass airflow sensor 54, or other airflow sensor, that provides a corresponding signal (MAF) to controller 30 indicative of the intake or induction airflow. A throttle valve 56 or other airflow control device may be used to modulate the airflow and control manifold pressure in intake 50 to control engine torque to a desired output torque in cooperation with ignition timing and fuel control, particularly for spark-ignition engines. Throttle valve 56 may be mechanically or electronically controlled by an appropriate actuator 58 based on a corresponding throttle position (TP) signal generated by controller 30. The throttle position (TP) signal may be generated to position the throttle in response to a corresponding engine output or torque requested by an operator via accelerator pedal 66. A throttle position sensor 60 provides a feedback signal to controller 30 indicative of the actual position of throttle valve 56 to implement closed loop control of throttle valve 56. Although the embodiment illustrated in FIG. 1 is a spark-ignited port injected engine, the system and method for monitoring valve deactivation according to the present disclosure are generally independent of the engine technology and apply to direct injection and/or compression ignition engines or modes of operation.

A manifold absolute pressure sensor 70 is used to provide a signal (MAP) indicative of the manifold pressure to controller 30. Air passing through intake manifold 52 enters combustion chamber 14 through appropriate control of one or more intake valves 16. Timing, activation, and deactivation of intake valves 16 and exhaust valves 18 may be controlled using electromagnetic actuators 72, 74, using a conventional camshaft arrangement, using a variable camshaft timing arrangement, or using a combination thereof depending on the particular application and implementation. In one embodiment, intake valves 72 are constant lift valves that are electromagnetically operated by controller 30 to control intake valve timing including opening, closing, and duration with exhaust valves 18 being operated by a camshaft or variable cam timing device. Intake valves 16 and/or exhaust valves 18 may be selectively activated and deactivated in response to a control signal from controller 30 using any of a number of electrical, mechanical, electromechanical, and/or hydraulic valve actuation mechanisms as generally known in the art. Cylinder (or valve) deactivation may be controlled in response to engine and/or ambient operating conditions to achieve desired engine and/or vehicle performance, fuel economy, and emissions goals, for example.

Rotational position information for controlling the engine may be provided by a crankshaft position sensor 80 that includes a toothed wheel 82 and an associated sensor 84. Crankshaft position sensor 80 may be used to generate a signal (PIP) used by controller 30 for fuel injection and ignition timing. In one embodiment, a dedicated integrated circuit chip within controller 30 is used to condition/process the raw rotational position signal generated by position sensor 80 and outputs a signal (PIP) once per cylinder per combustion cycle, i.e. for a eight-cylinder engine, eight PIP signals per combustion cycle are generated for use by the control logic. Crankshaft position may be used to define a crankshaft position window for comparing exhaust pressure associated with selectively deactivated cylinders to a corresponding reference value or threshold associated with valve-operating cylinders to detect valve lift as described in greater detail below. Crankshaft position sensor 80 may also be used to determine engine rotational speed and to identify cylinder combustion based on an absolute, relative, or differential engine rotational speed.

Depending on the particular application, an exhaust gas oxygen sensor 90 may be used to provide a signal (EGO) to controller 30 indicative of whether the exhaust gasses are lean or rich of stoichiometry. Likewise, depending upon the particular application, sensor 90 may provide a two-state signal corresponding to a rich or lean condition, or alternatively a signal that is proportional to the stoichiometry of the exhaust gases. When provided, this signal may be used to adjust the air/fuel ratio, or control the operating mode of one or more cylinders, for example. The exhaust gas is passed through the exhaust manifold and one or more catalysts 92 before being exhausted to atmosphere. An exhaust pressure sensor 94 (also referred to as an exhaust or engine backpressure (EBP) sensor) may be provided downstream of cylinder 14 and upstream of any catalyst 92. For applications having a "V" cylinder configuration, an exhaust pressure sensor 94 may be provided for each cylinder bank. Each exhaust pressure sensor 94 signal is analyzed by controller 30 to monitor performance of the valve deactivation system according to the present disclosure as illustrated and described in greater detail with respect to FIGS. 2-5. When exhaust valve openings are detected after valve deactivation, controller 30 may respond by storing a diagnostic code in computer readable storage media 28, activating a light or generating a message for the operator, and/or disabling subsequent cylinder deactivation, for example.

A fuel injector 100 injects an appropriate quantity of fuel in one or more injection events for the current operating mode based on a signal (FPW) generated by controller 30 and processed by driver 102. For spark-ignition applications, controller 30 generates a spark signal (SA) that is processed by ignition system 104 to control spark plug 106 and initiate combustion within chamber 14.

Controller 30 includes software and/or hardware implementing control logic to monitor operation of intake valves 16 and/or exhaust valves 18 and to control the engine in response. As described in greater detail with reference to FIGS. 2-5, controller 30 may monitor measured or inferred exhaust pressure for each cylinder bank to detect opening of exhaust valves 18 after a deactivation command. Exhaust pressure may be inferred from current operating parameters and/or signals provided by one or more engine sensors, or may be measured directly by a corresponding exhaust pressure sensor 94 for applications so equipped. In one embodiment, system 10 includes a "V" cylinder configuration with an exhaust pressure sensor 94 provided for each bank of cylinders. The signal from each exhaust pressure sensor 94 is analyzed to detect exhaust pressure fluctuations indicative of exhaust valves opening or lifting while deactivated. In response, controller 30 may control the engine to reduce or eliminate operation that could otherwise adversely impact reliability or durability of various affected components. For example, controller may selectively reactivate the cylinder(s) and/or exhaust valve(s) that were previously deactivated to determine whether the valve opening condition during deactivation is repeated. The controller may attempt multiple activation/deactivation cycles of the identified cylinder(s) or valve(s), and/or initiate various other diagnostic tests or remedial actions depending upon the particular application. Controller may also store a temporary or persistent diagnostic code in computer readable media 28 and/or illuminate a diagnostic light or message to alert an operator. Subsequent deactivation of one or more cylinders or valves may be inhibited until the diagnostic code is cleared or subsequent monitoring indicates the suspect exhaust valves or cylinders are operating as expected. Of course, the particular actions initiated or performed by controller 30 in response to detecting valve openings during deactivation may vary depending upon the particular application and implementation.

As previously described, under certain engine and/or ambient operating conditions, controller 30 may operate the engine in a reduced or variable displacement mode with one or more cylinders 12 being deactivated. Depending on the particular application, cylinder deactivation may include deactivating intake valves 16 and/or exhaust valves 18 using corresponding valve actuators 72, 74, which are implemented by electromagnetic actuators in the illustrated embodiment. However, the present disclosure is independent of the particular type of valve actuation and/or activation/deactivation mechanism. In one embodiment, both intake valves 16 and exhaust valves 18 are deactivated for an entire cylinder bank of a "V" engine using a mechanical/hydraulic deactivation system when operating in a reduced displacement mode. In this embodiment, the opposite cylinder bank includes conventional valve actuators that can not be deactivated. However, other embodiments may include the capability to selectively deactivate either cylinder bank. In one embodiment, the deactivation sequence occurs such that exhaust valves 18 on the deactivated cylinder bank deactivate sometime after an exhaust event. Intake valves 16 then deactivate sometime after beginning to lift. A fuel/air charge that was inducted into combustion chamber 14 is then compressed and ignited. During normal operation of a deactivated cylinder, the exhaust stroke does not eject the burnt charge from combustion chamber 14 because exhaust valve 18 is deactivated and remains closed. As such, the resulting exhaust pressure for the corresponding cylinder bank neither increases nor decreases. The same mean pressure occurs repeatedly each time the cylinder exhaust stroke occurs for the deactivated cylinder(s) and is substantially devoid of pulsations as illustrated in FIG. 2.

Figure 2:
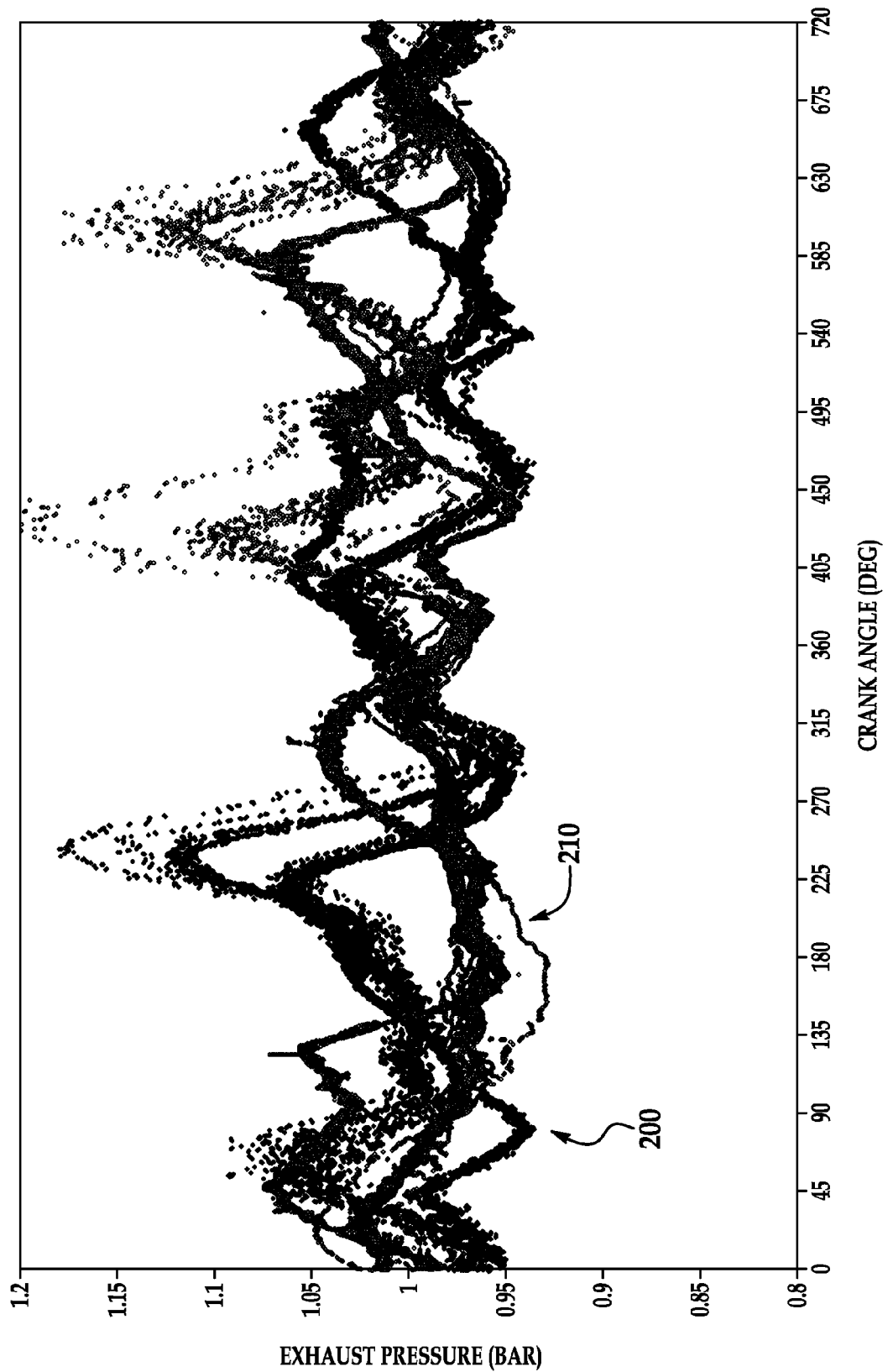
FIG. 2 is a graph illustrating representative exhaust pressure signals as a function of crank angle during variable displacement operation where exhaust valves remain closed.

FIG. 2 is a graph illustrating representative exhaust pressure signals as a function of crank angle during variable displacement operation where exhaust valves remain closed. The data points illustrated in FIG. 2 were produced by exhaust pressure sensors during a dynamometer test of an eight-cylinder engine having a "V" cylinder configuration with left and right cylinder banks each having four cylinders and operating at 1000 RPM. Data points 200 correspond to a right bank pressure sensor, while data points 210 correspond to a left bank pressure sensor. Data points 200, 210 illustrate expected variation of exhaust pressure as a function of crank angle over a representative combustion cycle of 720 crank angle degrees. For the test results illustrated in FIG. 2, exhaust pressure varies between about 0.94 bar and about 1.2 bar for a varying light to moderate load and substantially constant RPM operating conditions.

According to embodiments of the present disclosure, controller 30 monitors cylinder/valve deactivation to detect conditions where a deactivated cylinder has one or more exhaust valves 18 that continue to operate (lift or open) for one or more events after a deactivation command. In this situation, the first missed event allows the previously burnt charge to exhaust into the exhaust manifold creating a positive pressure pulse that may be detected by inference or by analysis of a signal provided by a corresponding exhaust pressure sensor 94. Subsequent events with the intake valves deactivated (closed) create a reduced pressure when the exhaust valve opens near bottom dead center (BDC) and pressure within combustion chamber 14 is lower than the exhaust manifold pressure. This causes exhaust gas to flow from the manifold back into cylinder 12 as illustrated by the representative exhaust pressure signals of FIG. 3.

Figure 3:
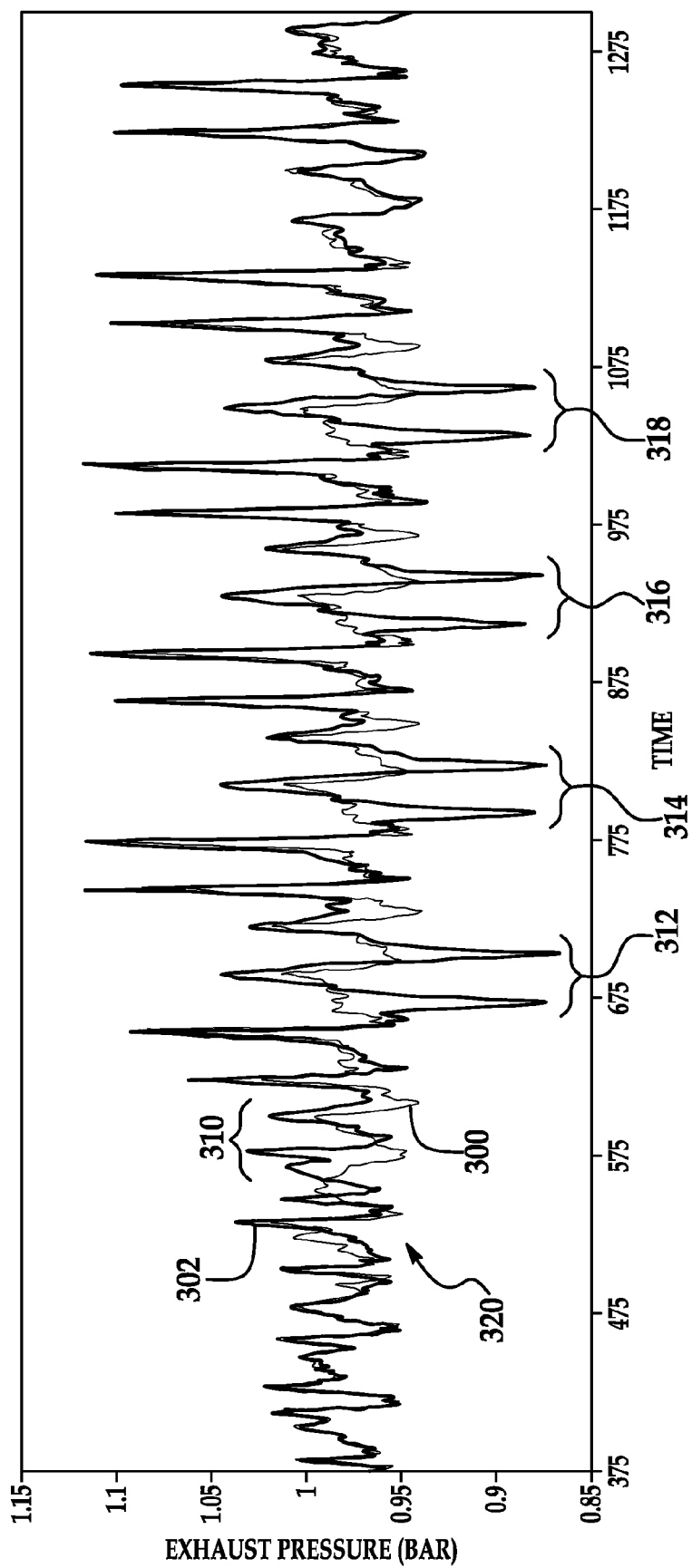
FIG. 3 is a graph illustrating a representative exhaust pressure signal during variable displacement operation where exhaust valves continue to open after a deactivation command.

FIG. 3 is a graph illustrating a representative exhaust pressure signal during variable displacement operation where exhaust valves continue to open after a deactivation command. The signals illustrated in FIG. 3 represent exhaust pressure for one cylinder bank of an eight-cylinder engine having a "V" cylinder configuration operating at 1000 RPM. Signal 300 corresponds to an exhaust pressure signal during deactivation for a bank of cylinders with exhaust valves closed, similar to the signals illustrated in FIG. 2. Signal 302 corresponds to an exhaust pressure signal during deactivation where at least one exhaust valve continues to operate after a deactivation command, which occurs as indicated at 320. As illustrated by signal 302, a somewhat higher exhaust pressure is detected during the first cycle after deactivation as represented at 310. The subsequent four combustion cycles indicated at 312, 314, 316, and 318 exhibit the effects of individual cylinder filling associated with gases from the exhaust manifold being drawn into the deactivated cylinder when the exhaust valve continues to open. As shown in FIG. 3, exhaust pressure signal 302 exhibits a significant decrease relative to exhaust pressure signal 300 and provides an acceptable signal to noise ratio for reliable monitoring of the operation of the exhaust valves during reduced displacement mode. For the representative signals 302, 304 illustrated in FIG. 3, exhaust pressure corresponding to the deactivated cylinder drops from about 0.97 bar when the exhaust valve is closed as represented by signal 300 during periods 312-318, to about 0.87 bar as represented by signal 302 during periods 312-318.

Figure 4:
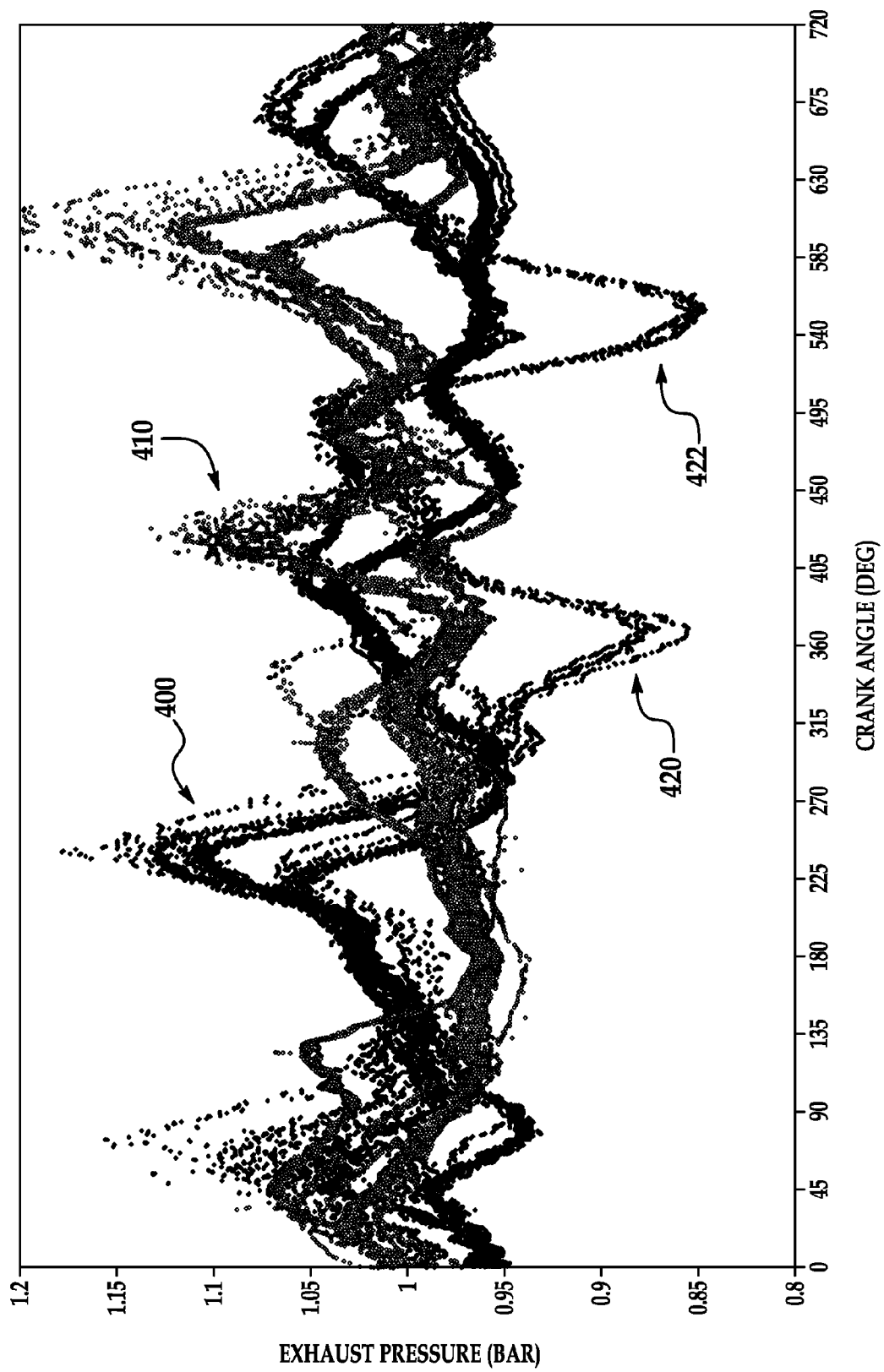
FIG. 4 is a graph illustrating representative exhaust pressure signals for use in monitoring operation of exhaust valve deactivation according to embodiments of the present disclosure.

FIG. 4 is a graph illustrating representative exhaust pressure values for use in monitoring operation of exhaust valve deactivation according to embodiments of the present disclosure. Similar to the data of FIG. 2, the data points illustrated in FIG. 4 were generated by exhaust pressure sensors during a dynamometer test of an eight-cylinder engine having a "V" cylinder configuration with left and right cylinder banks each having four cylinders and operating at 1000 RPM. Data points 400 correspond to a right bank exhaust pressure sensor, while data points 410 correspond to a left bank exhaust pressure sensor. Data points 400, 410 illustrate expected variation of exhaust pressure as a function of crank angle over a representative combustion cycle of 720 crank angle degrees. Data points 400 reflect decreased exhaust pressure associated with exhaust valves continuing to operate during deactivation at 420 and 422. Similar to the signals illustrated in FIG. 3, exhaust pressure drops to below 0.9 bar in the range of about 0.88 to about 0.85 bar when the exhaust valve opens during reduced displacement mode at 420 and 422.

Figure 5:
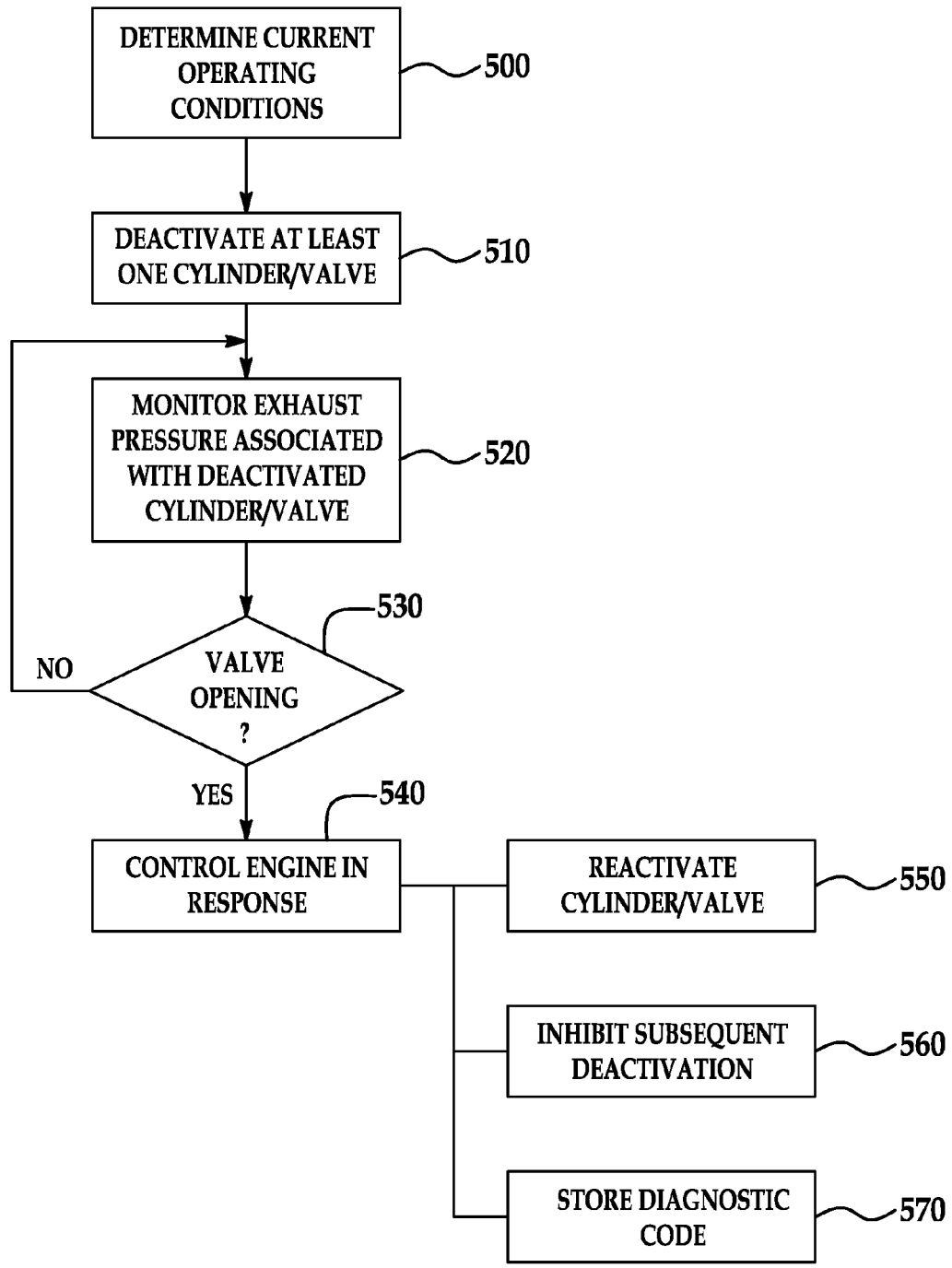
FIG. 5 is a flow chart illustrating operation of a system or method for monitoring valve deactivation using exhaust pressure according to the present disclosure.

FIG. 5 is a flow chart illustrating operation of one embodiment of a system or method for monitoring valve deactivation using exhaust pressure according to the present disclosure. The diagram of FIG. 5 provides representative control strategies for an internal combustion engine to monitor operation of a cylinder/valve deactivation system and control the engine in response. The control strategies and/or logic illustrated in FIG. 5 represent any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. Preferably, the control logic is implemented primarily in software executed by a microprocessor-based vehicle, engine, and/or powertrain controller, such as controller 30 (FIG. 1). Of course, the control logic may be implemented in software, hardware, or a combination of software and hardware in one or more controllers depending upon the particular application. When implemented in software, the control logic is preferably provided in one or more computer-readable storage media 28 (FIG. 1) having stored data representing code or instructions executed by a computer to control the engine. The computer-readable storage media may include one or more of a number of known physical devices which utilize electric, magnetic, and/or optical storage to keep executable instructions and associated calibration information, operating variables, and the like.

Block 500 of FIG. 6 represents determination of current operating conditions, which may include current operating mode(s) (idle, cruise, start, shutdown, reduced displacement, etc.) in addition to engine, vehicle, and/or ambient conditions or parameters (temperature(s), pressure(s), speed(s), state accessory operation, etc.). Current engine and/or ambient operating conditions or modes may be used in determining whether operation in a reduced displacement mode is desirable to meet vehicle performance, fuel economy, and emissions goals, for example. At least one cylinder/valve is selectively deactivated as represented by block 510. As previously described, cylinder deactivation may include deactivation of intake valves, exhaust valves, or both for one or more cylinders. In one embodiment, intake and exhaust valves are deactivated for all cylinders on a single cylinder bank when operating in reduced displacement mode and the opposite cylinder bank has conventionally operated valves that can not be deactivated. Exhaust pressure associated with the deactivated cylinder(s) is monitored as represented by block 520 to determine if one or more valves continue to open after deactivation as represented by block 530. In one embodiment, exhaust pressure is compared to a corresponding threshold and opening of deactivated exhaust valves is indicated where exhaust pressure is less than the threshold. The threshold may be determined based on current engine and/or ambient operating conditions, such as engine speed, load, oil temperature, ambient temperature, barometric pressure, etc. The threshold may be also be adjusted or calculated based on a sliding window for previous combustion cycles or events, for example. Similarly, other mathematical or statistical techniques may be applied to the exhaust pressure signal to detect changes in the exhaust pressure indicative of valve opening during deactivation.

In one embodiment, a threshold corresponding to a reference value provided for a particular crank angle window associated with a cylinder that is not deactivated, or not deactivatable, is used to monitor valve operation. Comparing exhaust pulses during corresponding crank angle windows where the valves do not deactivate with those exhaust pressures for crank angle windows where valves do deactivate during the same engine cycle provides a relative indication of whether or not the monitored valves are lifting, and may potentially cancel out noise factors. As an example, for a V-8 engine with four cylinders selectively deactivated and the remaining four cylinders conventionally actuated so they always lift, alternating cylinder events will correspond to non-deactivatable cylinders and may be used as a reference value or values indicative of valve lift. Exhaust pressure for a particular deactivated cylinder exhaust event may be compared to exhaust pressure of one or more adjacent events of the non-deactivatable cylinders to indicate lift. Various exhaust pressure characteristics may be used as a threshold or reference value, such as an average pressure, peak pressure, slope, concavity, etc.

If the exhaust pressure is not indicative of valve opening after deactivation, the engine controller continues to monitor operation of the exhaust pressure as represented by block 520. When analysis of exhaust pressure indicates that one or more exhaust valves are opening after deactivation as represented by block 530, the controller may initiate various actions to control the engine in response as represented by block 540. For example, the controller may reactivate one or more deactivated cylinders associated with detection of the valve opening as represented by block 550, inhibit subsequent deactivation of a particular cylinder or cylinder bank as represented by block 560, and/or store a diagnostic code or message as represented by block 570. Other actions may be performed depending on the particular application and implementation. In one embodiment, the engine controller may repeatedly activate and deactivate suspect cylinders/valves to determine if a repeatable condition is present.

As such, embodiments according to the present disclosure provide a system and method for monitoring valve deactivation of an internal combustion engine during a reduced displacement mode and controlling the engine in response. Embodiments may analyze exhaust pressure associated with a cylinder or group of cylinders to determine that one or more exhaust valves are opening during reduced displacement mode operation. Use of an exhaust pressure sensor to monitor operation of exhaust valve deactivation provides a more robust signal with better signal to noise ratio than various other strategies for more reliable system monitoring. Reliable monitoring of exhaust valve deactivation systems may lead to improved fuel economy and reduce or eliminate the potential for increased oil consumption and possible catalyst poisoning resulting from exhaust valves that do not respond to a deactivation command.

While one or more embodiments have been illustrated and described, it is not intended that these embodiments illustrate and describe all possible embodiments within the scope of the claims. Rather, the words used in the specification are words of description rather than limitation, and various changes may be made without departing from the spirit and scope of the disclosure. While various embodiments may have been described as providing advantages or being preferred over other embodiments or prior art implementations with respect to one or more desired characteristics, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed:

1. A method for controlling an internal combustion engine operable in a reduced displacement mode, the method comprising:
   detecting opening of at least one exhaust valve associated with a deactivated cylinder during reduced displacement mode operation in response to exhaust pressure associated with the deactivated cylinder.

2. The method of claim 1 wherein detecting comprises:
   comparing change in exhaust pressure during a crank angle window associated with an exhaust valve opening event.

3. The method of claim 1 wherein detecting comprises:
   detecting opening of at least one exhaust valve when associated exhaust pressure is less than a corresponding threshold.

4. The method of claim 1 further comprising controlling the engine in response to detecting opening of the at least one exhaust valve.

5. The method of claim 4 wherein controlling the engine comprises reactivating at least one deactivated cylinder.

6. The method of claim 4 wherein controlling the engine comprises inhibiting subsequent operation in reduced displacement mode.

7. The method of claim 4 wherein controlling the engine comprises inhibiting subsequent deactivation of at least one cylinder.

8. The method of claim 4 wherein the threshold corresponds to a reference exhaust pressure associated with at least one cylinder having activated exhaust valves.

9. The method of claim 8 wherein the engine includes cylinders arranged in first and second cylinder banks and wherein detecting comprises monitoring signals from first and second exhaust pressure sensors associated with the first and second cylinder banks, respectively.

10. The method of claim 1 further comprising inferring exhaust pressure associated with at least one cylinder.

11. An internal combustion engine having at least one selectively deactivated exhaust valve, the engine comprising:
   a first exhaust pressure sensor; and
   a controller in communication with the exhaust pressure sensor, the controller controlling the engine in response to the exhaust pressure sensor indicating opening of at least one exhaust valve after deactivation.

12. The engine of claim 11 wherein the engine includes cylinders arranged in a first and second cylinder bank, the engine further comprising:
   a second exhaust pressure sensor, wherein the first and second exhaust pressure sensors are positioned to measure exhaust pressure associated with the first and second cylinder banks, respectively.

13. The engine of claim 11 wherein the controller determines at least one exhaust valve opening in response to associated exhaust pressure being below a corresponding threshold.

14. The engine of claim 11 wherein the controller reactivates at least one deactivated exhaust valve in response to detecting opening of an exhaust valve after deactivation.

15. The engine of claim 11 wherein the controller inhibits subsequent deactivation of at least one exhaust valve after detecting opening of an exhaust valve after deactivation.

16. The engine of claim 11 wherein the controller stores a diagnostic code in response to detecting opening of an exhaust valve after deactivation.

* * * * *